3,650,938
ADAPTIVE CONTROL FOR AN ELG MACHINE
Peter F. Olton and Harry D. Kauffman, Cincinnati, Ohio,
assignors to Cincinnati Milacron Inc., Cincinnati, Ohio
Filed Aug. 24, 1970, Ser. No. 66,331
Int. Cl. C23b 5/78
U.S. Cl. 204—218                                9 Claims

ABSTRACT OF THE DISCLOSURE

An apparatus for use in an ELG process for automatically changing the relative velocity between a tool and workpiece as a function of current flow therebetween and thereby maintaining an approximately constant ratio of metal removed electrolytically to metal removed by grinding. Input circuits are provided for predetermining a maximum relative velocity between the tool and workpiece, an ideal current magnitude, and a response time for changing the relative velocity. Machining currents at or below the ideal magnitude initiate the maximum relative velocity. However, when the machining current exceeds the ideal magnitude, the apparatus operates to introduce a change in the magnitude of the relative velocity. The time rate of said change is controlled by the predetermined response time.

BACKGROUND OF THE INVENTION

The invention relates generally to an electrolytic grinding (ELG) machine; and specifically, the invention is concerned with the automatic control thereof to provide an efficient machining process. An ELG machine typically has a wheelhead comprised of an electrically conductive grinding wheel, and a motor for rotating said wheel. A machine table for supporting an electrically conductive workpiece is provided with a driving mechanism for producing a relative linear or rotary movement at a predetermined velocity between the grinding wheel and workpiece. This predetermined velocity is independent of the grinding wheel rotation and will be referred to as the feed rate.

There has only been a minimal amount of research and development in the automatic control of the electrolytic grinding process. The vast majority of development work has been in the electro-chemical machining (ECM) field. However, there are several significant distinctions between the ECM and ELG processes that make them fields for independent development. First, ECM is purely an electrolytic process having a definite working gap between the tool and workpiece. Second, the working area between the tool and workpiece may be of infinite complexity, and it may vary over an infinite range of area magnitudes. Third, the depth of an ECM cut is subject to a wide range of magnitudes. In contrast, in the ELG process, there is contact between the tool and workpiece. Hence the working gap is controlled by the protrusions of the grit on the wheel surface. Second, with a rotating wheel, the wheel configuration and general shape of the working or contact area between the wheel and workpiece tends to be constant. In other words, the variation of working area magnitudes is minimal. Third, in general, the depth of cut in the ELG process will have a magnitude range that is substantially smaller than in the ECM process.

Fom the above, one can see that problems exist in the ECM field that are not relevant to the ELG field and vica versa. For example, gap cleansing, gap size and electrolyte conductivity are important and widely variable factors in ECM. In ELG, the contact between the tool and work reduces these problems. However, this contact presents a problem in ELG that is undefined in ECM. This problem is the control of the ratio of the volume of metal removed by electrolysis to the volume of metal removed by grinding. For purposes of this disclosure, this ratio will be referred to as the electrolytic to mechanical metal removal ratio. Tests have shown that the most economic ratio in the great majority of situations is 90:10. In other words, approximately 90% of the metal is removed by electrolysis, and approximately 10% of the metal is removed by grinding. If the ratio decreases from a predetermined ideal, or more metal is removed by grinding and less is removed by electrolysis, one will experience excessive wear on the grinding wheel which is relatively expensive. Further, reducing the feed rate to decrease wheel wear results in longer machining times. Likewise, if the ratio is increased to where grinding is minimized, other problems result. First, one purpose of the grinding wheel is to keep the working area clean and remove the machined metal. This is accomplished with a high pressure wash of electrolyte in ECM. By reducing the grinding effect below the ideal, the cleansing action is reduce; and the electrolytic process is inhibited and less efficient. Second, the grinding also contributes to the surface finish. As the grinding is decreased, the surface finish is altered thus producing poor quality parts.

Applicant proposes an apparatus that adapts to nonuniform or adverse machining conditions such as irregularities in the shape or surface of the workpiece. The apparatus in response thereto changes the machining parameters in a manner to maintain the electrolytic to mechanical metal removal ratio approximately constant. Input controls are provided for establishing predetermined values of an ideal maximum feed rate and an ideal machining current at said feed rate. As the wheel progresses along the workpiece, and a protrusion such as a weldment is encountered, the increased machining area will cause an increase in current flow above the predetermined ideal current. This results in a corresponding decrease in the electrolytic to mechanical metal removal ratio as the metal removed by grinding increases faster than the metal removed electrolytically. Therefore, the apparatus reduces the feed rate in response to the excessive current.

The apparatus has another input control for predetermining the maximum percentage the feed rate is allowed to decrease. This is necessary to maintain the most economic machining process. Even though the metal removal ratio defines the most efficient process, the reduced feed rate may result in such an extended cycle time that it would be more economical to machine with a non-ideal electrolytic to mechanical metal removal ratio. Hence, economically there is a point of diminishing return in attempting to maintain the ratio constant. The maximum percentage decrease input should be set to correspond to this point of diminishing return. One other condition exists where it is uneconomical to attempt to maintain the ratio approximately constant. This condition occurs where the irregularities in the workpieces are of a minor nature. In these situations, it is more economical to machine for a short period of time at an inefficient ratio than to change the feed rate and extend the overall cycle time. Therefore, another input control is available for predetermining the response time of the apparatus. An operator can determine by inspection the general nature of the workpiece surface. If there are a relatively large number of minor irregularities, the time response may be set at a maximum. If there are only a few irregularities, the time response may be set at a minimum. Therefore applicant's apparatus provides an automatic cycle that provides a more constant electrolytic to mechanical metal removal ratio than prior systems. Further, boundary conditions may be established that further control the machining cycle in those unique situations where it is uneconomical to continuously try to maintain the ratio approximately constant.

SUMMARY OF THE INVENTION

An apparatus for use in the ELG process wherein an electrically conductive rotatably mounted tool and an electrically conductive workpiece are connected to a DC power supply and positioned to pass a machining current therebetween. A driving mechanism is provided independent of tool rotation for removing the tool and workpiece relative to each other. Input controls are provided for selecting an ideal current magnitude and a maximum relative velocity between the tool and workpiece. For machining currents below the ideal value, the relative velocity is equal to its maximum value. When the machining current exceeds the ideal magnitude, the relative velocity is decreased from its maximum value. Further, response circuits may be provided for controlling the time rate of change of the relative velocity with respect to changes in the machining current. This response time may be varied to suit a particular application. Finally circuits may be provided for predetermining the maximum amount that the relative velocity will decrease for excessive increases in machining current.

DESCRIPTION OF THE PREFERRED EMBODIMENT

Figure 1:
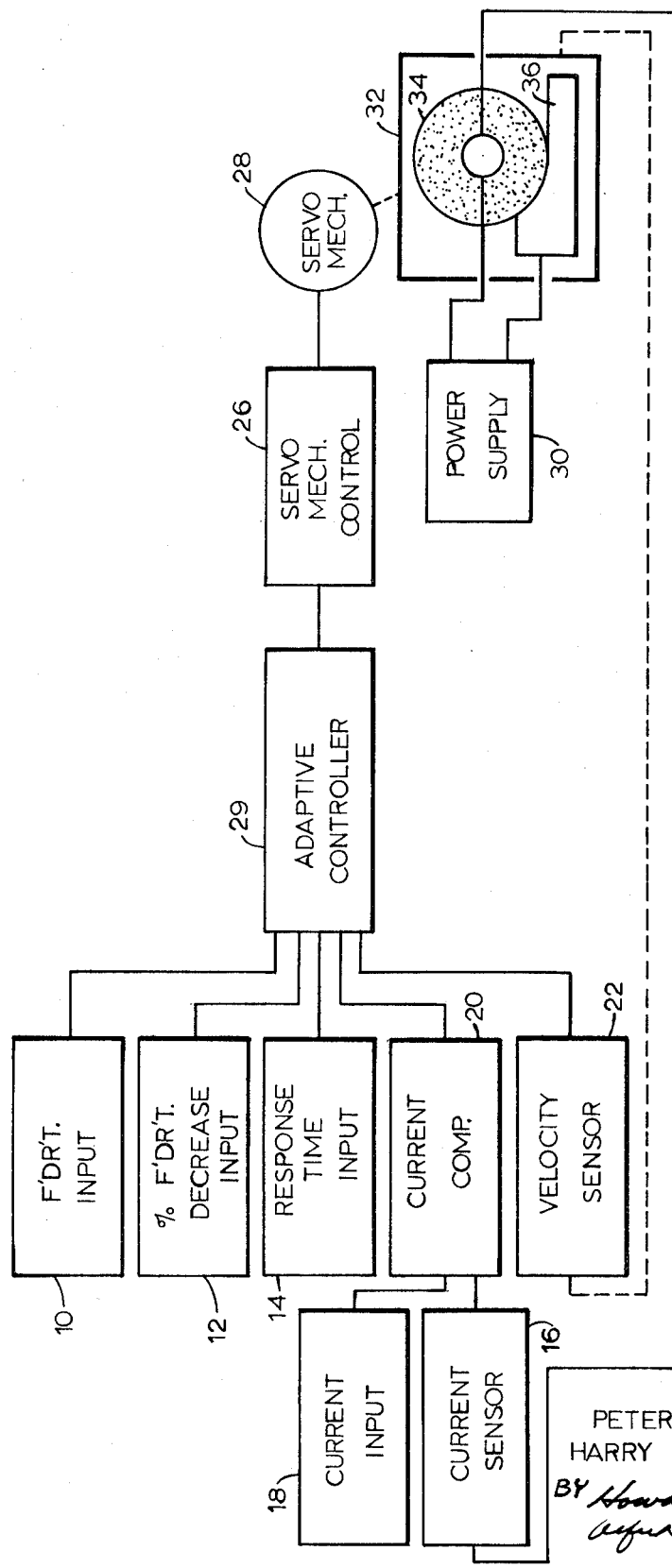
FIG. 1 is a block diagram illustrating an ELG apparatus including the adaptive control.

FIG. 1 is a block diagram of an ELG apparatus including the proposed adaptive control. The feed rate input circuit 10 permits an operator to input to the system a predetermined maximum feed rate. The feed rate circuit 10 produces an output signal representing the maximum feed rate selected. The percentage decrease in feed rate input circuit 12 permits the operator to select the maximum percentage decrease that is consistent with an economical machining cycle, and the circuit 12 produces an output signal representing the percentage selected. In a similar manner, the response time input circuit 14 produces a response signal and allows the operator to predetermine the response time in accordance with the characteristics of the machining to be done. A current sensor 16 is operative to measure the current flow from the power supply 30 and produces an output current signal proportional thereto. A current input circuit 18 allows the operator to predetermine an ideal machining current, and said control produces an ideal current signal proportional to the selected magnitude. A current comparison network 20 is connected to the input circuit 18 and sensor 16 to produce a current difference signal when the magnitude of the measured machining current exceeds the predetermined ideal current. Finally, a velocity sensor 22 is mechanically adapted to the machine 32 and operates to produce a velocity feedback signal proportional to the actual feed rate of the tool relative to the workpiece. The outputs from the input circuits 10, 12 and 14, the current comparison network 20 and the velocity sensor 22 are input to an adaptive controller 29 which operates to generate a command signal. Said command signal represents a feed rate between the selected maximum feed rate and the minimum feed rate as defined by the percentage of decrease therefrom. The command signal is derived by modifying the maximum feed rate signal as a function of increases of the machining current over the ideal selected current. The rate of change of the command signal is dependent on the response time selected. The command signal is input to a servomechanism control 26. Typically such a control may take the form of an amplifier which produces an output sufficient to drive a servomechanism 28. The servomechanism 28 may typically consist of a rate valve and hydraulic motor, said valve being responsive to the output from the control 26 to port a flow rate of fluid to the motor. The servomechanism 28 is adapted to the machine 32 and provides a relative motion between the wheelhead 34 and the workpiece 36. This relative motion may typically be provided by mounting the workpiece on a rotating table. It should be noted that the servomechanism may be an electric servomechanism or may be just a driving mechanism such as a stepping motor. Finally FIG. 1 shows a direct current power supply 30 connected between the tool 34 and workpiece 36 to provide a current flow for the electrolytic removal of material from the workpiece in a typical manner.

Figure 2:
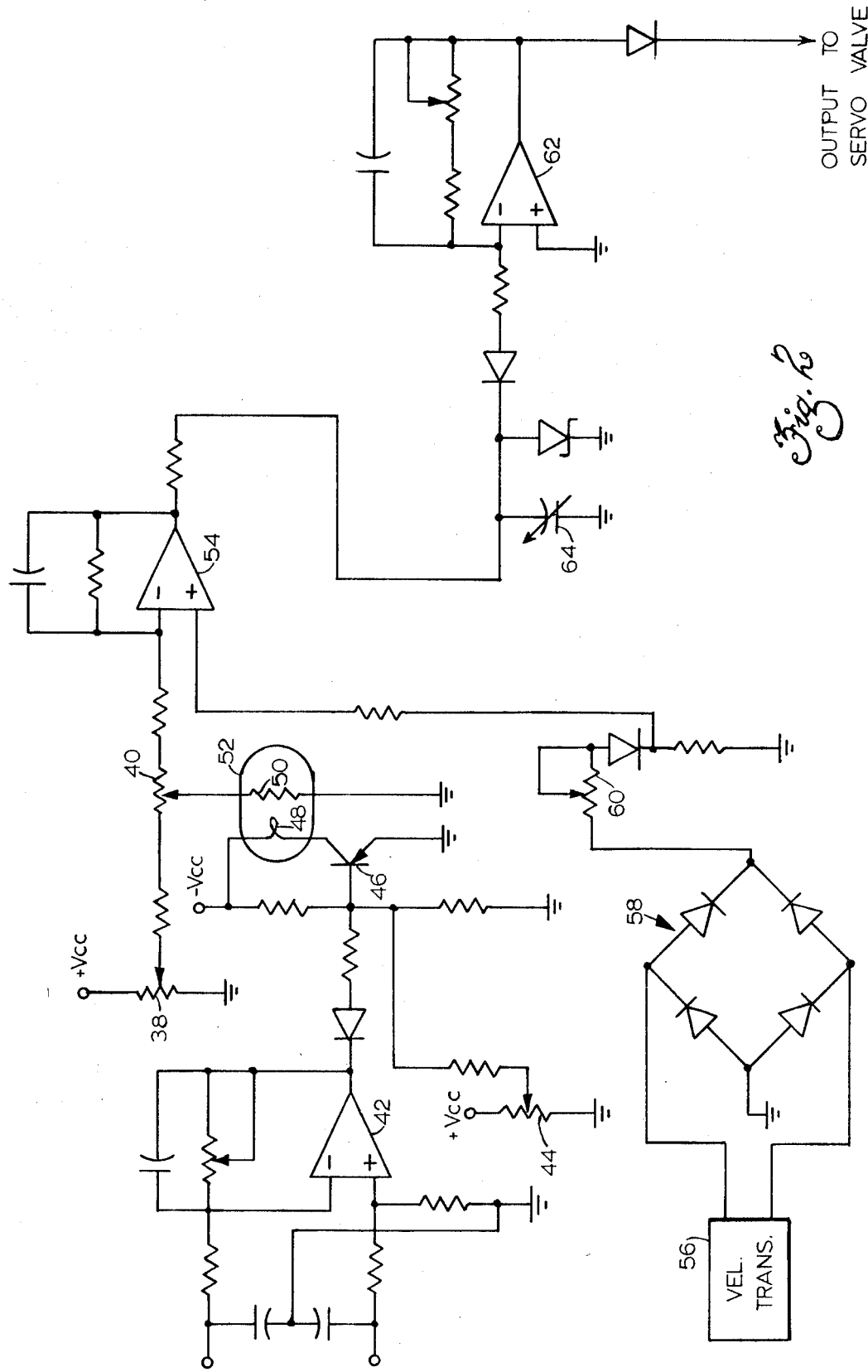
FIG. 2 is a detailed schematic diagram illustrating the preferred embodiment of the adaptive control.

FIG. 2 is a detailed schematic diagram of the preferred embodiment of the disclosed invention. A potentiometer 38 produces a signal proportional to the desired maximum feed rate. This signal is an output on the potentiometer wiper arm which is in series with another potentiometer 40. The phototentiometer 40 determines the maximum percentage of decrease of the feed rate selected on the potentiometer 38. The current measurement is accomplished by a shunt (not shown) connected in the output of the power supply. The inputs of the operational amplifier 42 are connected across the shunt. The output from the amplifier 42 is a negative signal level proportional to the current flow through the shunt. The potentiometer 44 is used to establish the ideal current flow, and its wiper arm contains an output signal of a positive level proportional to the selected ideal current. The outputs from the amplifier 42 and the potentiometer 44 are connected to the base of transistor 46. Connected in the collector circuit of the transistor 46 is an emitter 48 of an isolator 52. The receiver 50 of the isolator 52 is connected in series with the potentiometer 40. The isolator 52 is used to provide an electrical isolation between the current detection circuitry and the feed rate control circuits. Under normal machining conditions, the resistance of the receiver 50 is very high therefore the signal from the potentiometer 40 represents the feed rate selected by the potentiometer 38. However if the grinding wheel encounters an irregularlity in the surface of the workpiece, and the machining area increases, the measured machining current will begin to exceed the selected ideal current. Hence the magnitude of the negative level of the output signal from the amplifier 42 correspondingly exceeds the positive level of the output signal on the wiper arm of potentiometer 44. This results in a negative potential in the base of transistor 46 causing it to fully conduct. The increased current flow through the collector circuit of transistor 46 excites the emitter 48 causing it to emit photons. The receiver 50 being comprised of a photo sensitive material decreases its resistance as a function of the intensity of the photon emissions. Consequently, when the transistor 46 conducts, the resistance of the receiver 50 drops substantially as does the signal level from the potentiometer 40. The decreased signal level represents a reduction in the feed rate, and the magnitude of reduction is limited by the setting of potentiometer 40. The signal from the potentiometer 40 provides one input to an operational amplifier 54 connected in a differential amplifier configuration. The other input is coupled to a velocity transducer 56 which provides a velocity feedback signal. The transducer 56 may be a tachometer or similar device. The tachometer output passes through the bridge network 58 and is input to potentiometer 60. The bridge network operates to reverse the polarity of the tachometer signal when the velocity reverses direction. The potentiometer 60 allows the feedback signal to be adjusted to an appropriate magnitude. Under normal machining conditions, the output of the amplifier 54 is a command signal representing the feed rate selected by the potentiometer 38. The command signal is coupled to the operational amplifier 62 which operates as a servoamplifier. The output of amplifier 62 is used to excite a rate or servo valve. As described earlier, when the machining current exceeds the ideal magnitude, the signal level from the potentiometer 40 decreases. This causes the output of amplifier 54 to decrease. However, the variable capacitor 64 which is used to establish the response time now discharges through the amplifier 62. Hence, the command signal and the feed rate decrease exponentially to the minimum value determined by the potentiometer 40. As the machining continues, the machining area will decrease as the irregularity in the workpiece is removed. When this happens, the machining current will decrease to the ideal current magnitude as determined by potentiometer 44. The base of transistor 46 will increase to a more positive potential, and conduction through transistor 46 will decrease. This reduces the current flow in the collector circuit and photon emissions from the emitter 48 will decrease. Consequently the resistance of the receiver 50 will increase substantially, and the signal level from the potentiometer 40 will increase. The output of amplifier 54 which drives the input of amplifier 62 will also increase but exponentially according to the desired response time as the capacitor 64 accumulates a charge. When the capacitor 64 is fully charged, the command signal input to amplifier 62 represents a feed rate defined by the setting of potentiometer 38.

While the invention has been illustrated in some detail according to the preferred embodiment shown in the accompanying drawings, and while the preferred illustrated embodiment has been described in some detail, there is no intention to thus limit the invention to such details. On the contrary, it is intended to cover all modifications, alterations and equivalents falling within the spirit and scope of the appended claims.

What is claimed is:

1. An improved ELG apparatus of the type comprising an electrically conductive rotating wheel and an electrically conductive workpiece connected to a direct current power supply providing a current flow therebetween, said apparatus including a driving mechanism for providing a relative motion between the tool and workpiece, wherein the improvement comprises:
    (a) a velocity input circuit for selecting a relative velocity between the tool and workpiece;
    (b) a current input circuit for selecting a current flow between said tool and workpiece and producing a current signal;
    (c) a current sensnig circuit for measuring the current flow between the tool and workpiece and producing a measured current signal; and
    (d) a control circuit connected to the input circuits, the sensing circuit, and the driving mechanism for decreasing the relative velocity as a function of the measured current signal exceeding the current signal.

2. The apparatus of claim 1 wherein the control circuit further comprises a response time input circuit for controlling the time rate of change of the decrease in the relative velocity.

3. The apparatus of claim 2 wherein said control circuit further comprises an input circuit for limiting the magnitude of the decrease in the relative velocity.

4. An improved ELG apparatus of the type comprising an electrically conductive rotating tool and an electrically conductive workpiece coupled to a direct current power supply providing a current flow therebetween, said apparatus including a driving mechanism for producing a relative motion between the tool and workpiece independent of the tool rotation, wherein the improvement comprises:
    (a) a velocity input circuit for selecting a relative velocity between the tool and workpiece and producing a velocity signal;
    (b) a current input circuit for selecting an ideal current flow between the tool and workpiece and producing an ideal current signal;
    (c) an electrical network coupled to the power supply and the current input circuit for detecting an increase of the current flowing between the tool and workpiece over the ideal current flow;
    (d) a control circuit having inputs connected to the electrical network and the velocity input circuit and an output connected to the driving mechanism for modifying the velocity signal as a function of the detected increase of current flow and producing a command signal for exciting the driving mechanism.

5. The apparatus of claim 4 wherein the control circuit further comprises means for controlling the time rate of change of said command signal.

6. The apparatus of claim 5 wherein said control circuit further comprises an input circuit for predetermining the total amount the velocity signal is to be modified.

7. An improved ELG apparatus of the type comprising an electrically conductive rotating tool mounted adjacent to a work station containing an electrically conductive workpiece and connected to a power supply for passing a direct current between the tool and workpiece through an electrolytic medium, said apparatus including a servomechanism for moving said workpiece relative to said tool at a commanded velocity independent of the tool rotation, wherein the improvement comprises:
    (a) a velocity input circuit for selecting a maximum relative velocity between the tool and workpiece and producing a maximum velocity signal;
    (b) a current input circuit for selecting an ideal machining current between the tool and workpiece and producing an ideal current signal;
    (c) a current sensor connected to the power supply for measuring the magnitude of the current flow between the tool and workpiece and producing a measured current signal;
    (d) a comparator network connected to the current impact circuit and the current sensor for producing an output current signal representing an excess of the measured current signal over the ideal current signal;
    (e) a velocity transducer coupled to the servomechanism for producing a velocity feedback signal representing the actual relative velocity between the tool and workpiece;
    (f) a control circuit having inputs coupled to the velocity input circuit, the comparator network and the velocity sensor and an output coupled to the servomechanism for modifying the maximum relative velocity as a function of the presence of the output current signal and producing a command signal for driving the servomechanism.

8. The apparatus of claim 7 wherein the control circuit further comprises a response time input for controlling the rate at which the command signal may change in magnitude.

9. The apparatus of claim 8 wherein the control circuit further comprises an input circuit for controlling the maximum percentage of modification in the relative velocity signal.

References Cited

UNITED STATES PATENTS

| | | | |
|---|---|---|---|
| 3,401,102 | 9/1968 | Stiff | 204—225 X |
| 3,442,784 | 5/1969 | Wieck | 204—143 G |
| 3,442,785 | 5/1969 | Easton | 204—225 X |
| 3,533,925 | 10/1970 | Inoue | 204—143 G |

JOHN H. MACK, Primary Examiner

D. R. VALETINE, Assistant Examiner

U.S. Cl. X.R.

204—143 G, 225, 228